United States Patent
Chen et al.

(10) Patent No.: US 9,549,121 B2
(45) Date of Patent: Jan. 17, 2017

(54) IMAGE ACQUIRING METHOD AND ELECTRONIC DEVICE

(71) Applicant: LENOVO (BEIJING) LIMITED, Beijing (CN)

(72) Inventors: Yu Chen, Beijing (CN); Diandian Qian, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 189 days.

(21) Appl. No.: 14/228,966

(22) Filed: Mar. 28, 2014

(65) Prior Publication Data
US 2015/0042837 A1    Feb. 12, 2015

(30) Foreign Application Priority Data
Aug. 9, 2013    (CN) .................... 2013 1 0347518

(51) Int. Cl.
H04N 5/232    (2006.01)
H04N 5/262    (2006.01)
G06T 11/00    (2006.01)

(52) U.S. Cl.
CPC .......... *H04N 5/23229* (2013.01); *G06T 11/00* (2013.01); *H04N 5/23216* (2013.01); *H04N 5/23293* (2013.01); *H04N 5/262* (2013.01)

(58) Field of Classification Search
CPC ........... H04N 5/23229; H04N 5/23216; H04N 5/23293; H04N 5/262; G06T 11/00
USPC ........................................... 348/222.1
See application file for complete search history.

(56) References Cited

U.S. PATENT DOCUMENTS

| | | | | |
|---|---|---|---|---|
| 2012/0301032 A1* | 11/2012 | Kawanishi | ........ | G06F 17/30247 382/190 |
| 2014/0320418 A1* | 10/2014 | Tseng | ................ | G06F 3/04883 345/173 |
| 2014/0376815 A1* | 12/2014 | Nomura | ............ | G06F 17/30784 382/195 |

* cited by examiner

*Primary Examiner* — Twyler Haskins
*Assistant Examiner* — Fayez Bhuiyan
(74) *Attorney, Agent, or Firm* — Scully Scott Murphy & Presser

(57) ABSTRACT

The method of acquiring image comprises: acquiring a first image; determining a first sub-image corresponding to a first object from the first image; and replacing the first sub-image with a second sub-image different from the first sub-image to obtain a second image. This solution may replace the first sub-image with the second sub-image, thereby achieving the technical effect of automatically removing a part of content from the image during image acquiring.

15 Claims, 7 Drawing Sheets

IMAGE ACQUIRING METHOD AND ELECTRONIC DEVICE

TECHNICAL FIELD

The present disclosure relates to a field of multimedia technology, and in particular, to an image acquiring method and an electronic device.

BACKGROUND

With development of electronic technology, functions of various electronic devices are becoming more and more colorful and humanized. This may lead to better user experience in using electronic devices. Moreover, there are kinds of electronic devices, such as a camera, a tablet computer, a mobile phone, etc.

Conventionally, the electronic devices may be provided with an image acquiring device for take photos or video. An image or video may contain some interfering content that is not desired by the user. For example, when taking a photo of the user A, the user B occurs in a background. As another example, garbage is presented when taking a landscape photos.

Some photo processing software may be used to process the captured photos, so as to eliminate such interfering content.

After acquiring an image by an image acquiring device, if the image contains interfering content, other image processing software has to be used for eliminating the interfering content. That is, there is a technical problem that a part of content in an image cannot be automatically removed when acquiring the image.

Furthermore, because some image processing software is needed to remove a part of content in the image, it is needed to firstly start the image processing software and then import the image into the image processing software. This may spend long time in removing a part of content in the image while increasing processing burdens on the electronic device.

SUMMARY

Embodiments of the present disclosure provide an image acquiring method and an electronic device, which can solve the problem that it is impossible to automatically remove a part of content from an image during image acquiring.

A first aspect of the present disclosure provides an image acquiring method. The method comprises: acquiring a first image; determining a first sub-image corresponding to a first object from the first image; and replacing the first sub-image with a second sub-image different from the first sub-image to obtain a second image.

Optionally, determining the first sub-image corresponding to the first object from the first image comprises: analyzing a first area of the first image to determine the first sub-image.

Optionally, before analyzing the first area of the first image, the method further comprises: determining an area where an entirety of the first image is located as the first area; or determining an area of the first image other than a preset area as the first area.

Optionally, before analyzing the first area of the first image, the method further comprises: detecting a first touch operation of a user; and determining an area where the first touch operation occurs as the first area.

Optionally, before analyzing the first area of the first image, the method further comprises: determining at least one object by performing image recognition on the first area; determining a first object matched with at least one preset object from the at least one object; and determining an image of an area where the first object is located as the first sub-image.

Optionally, analyzing the first area of the first image to determine the first sub-image comprises: dividing an image corresponding to the first area into M sub-images, M being a positive integer; performing color channel histogram analysis on each of the M sub-images to determine M color histograms; determining a first color histogram from the M color histograms, an absolute value of a difference between the first color histogram and a second color histogram of a neighboring area being larger than a first preset threshold; and determining a sub-image of an area where the first color histogram is located as the first sub-image.

Optionally, analyzing the first area of the first image to determine the first sub-image comprises: analyzing the first area to determine a second object; determining whether the second object is matched with any preset object of at least one preset object; and determining an image where the first area is located as the first sub-image when the second object is matched with any preset object.

Optionally, before replacing the first sub-image with the second sub-image different from the first sub-image, the method further comprises: determining the second sub-image based on a neighboring area of an area where the first sub-image is located by applying an image inpainting algorithm.

Optionally, before replacing the first sub-image with the second sub-image different from the first sub-image, the method further comprises: acquiring at least one image containing the same scene as that in the first image; determining from the at least one image a third image that does not contain the first object; and determining a sub-image of the third image, which is located in the same area as the first sub-image, as the second sub-image.

Optionally, replacing the first sub-image with the second sub-image different from the first sub-image comprises: detecting a second operation of a user sliding back and forth on a surface of the first sub-image; and responding to the second operation by replacing the first sub-image with the second sub-image.

Optionally, after determining the first sub-image corresponding to the first object from the first image, the method further comprises: displaying a first operation identifier on the first sub-image to prompt a user to replace the first sub-image with the second sub-image by performing a second operation.

Optionally, after replacing the first sub-image with the second sub-image different from the first sub-image, the method further comprises: displaying a second operation identifier on the second sub-image to prompt the user to restore the second sub-image to the first sub-image by a third operation for the second operation identifier.

Optionally, the second operation includes an operation of clicking the first operation identifier, or the third operation includes an operation of clicking the second operation identifier.

A second aspect of the present disclosure provides an electronic device. The electronic device comprises: a first acquiring module configured to acquire a first image; a first determining module configured to determine a first sub-image corresponding to a first object from the first image; and a replacing module configured to replace the first sub-image with a second sub-image different from the first sub-image to obtain a second image.

Optionally, the first determining module is configured to: analyze a first area of the first image to determine the first sub-image.

Optionally, the electronic device further comprises: a second determining module configured to, before analyzing the first area of the first image, determine an area where an entirety of the first image is located as the first area; or determine an area of the first image other than a preset area as the first area.

Optionally, the electronic device further comprises: a detecting module configured to, before analyzing the first area of the first image, detect a first touch operation of a user; and a third determining module configured to determine an area where the first touch operation occurs as the first area.

Optionally, the first determining module comprises: a first determining unit configured to determine at least one object by performing image recognition on the first area; a second determining unit configured to determine a first object matched with at least one preset object from the at least one object; and a third determining unit configured to determine an image of an area where the first object is located as the first sub-image.

Optionally, the first determining module comprises: a dividing unit configured to divide an image corresponding to the first area into M sub-images, M being a positive integer; a first analysis unit configured to perform color channel histogram analysis on each of the M sub-images to determine M color histograms; a fourth determining unit configured to determine a first color histogram from the M color histograms, an absolute value of a difference between the first color histogram and a second color histogram of a neighboring area being larger than a first preset threshold; and a fifth determining unit configured to determine a sub-image of an area where the first color histogram is located as the first sub-image.

Optionally, the first determining module comprises: a second analysis unit configured to analyze the first area to determine a second object; a determining unit configured to determine whether the second object is matched with any preset object of at least one preset object; and a sixth determining unit configured to determine an image where the first area is located as the first sub-image when the second object is matched with any preset object.

Optionally, the electronic device further comprises: a fourth determining module configured to, before replacing the first sub-image with the second sub-image different from the first sub-image, determine the second sub-image based on a neighboring area of an area where the first sub-image is located by applying an image inpainting algorithm.

Optionally, the electronic device further comprises: a second acquiring module configured to, before replacing the first sub-image with the second sub-image different from the first sub-image, acquire at least one image containing the same scene as that in the first image; a fifth determining module configured to determine from the at least one image a third image that does not contain the first object; and a sixth determining module configured to determine a sub-image of the third image, which is located in the same area as the first sub-image, as the second sub-image.

Optionally, the replacing module comprises: a detecting unit configured to detect a second operation of a user sliding back and forth on a surface of the first sub-image; and a responding unit configured to respond to the second operation by replacing the first sub-image with the second sub-image.

Optionally, the electronic device further comprises: a first displaying module configured to, after determining the first sub-image corresponding to the first object from the first image, display a first operation identifier on the first sub-image to prompt a user to replace the first sub-image with the second sub-image by performing a second operation.

Optionally, the electronic device further comprises: a second displaying module configured to, after replacing the first sub-image with the second sub-image different from the first sub-image, a second operation identifier on the second sub-image to prompt the user to restore the second sub-image to the first sub-image by a third operation for the second operation identifier.

Optionally, the second operation includes an operation of clicking the first operation identifier, or the third operation includes an operation of clicking the second operation identifier.

The present disclosure has advantages as follows.

The embodiments of the present disclosure may determine from the first image the first sub-image corresponding to the first object after acquiring the first image, and replace the first sub-image with the second sub-image to form the second image. This may automatically remove a part of content in the first image.

Furthermore, because there is no additional image processing software needed to process the first image, the present disclosure may reduce computation of removing a part of content in the image while reducing processing burdens on the electronic device.

DETAILED DESCRIPTION OF THE EMBODIMENTS

In order to solve the technical problem that a part of content in an image cannot be removed automatically when acquiring the image, the present disclosure provides an image acquiring method and an electronic device.

A technical solution of the present disclosure may be described as acquiring a first image; determining a first sub-image corresponding to a first object from the first image; and replacing the first sub-image with a second sub-image different from the first sub-image to obtain a second image. The first sub-image may be obtained by analyzing a first area of the first image. The first area may be either an area where an entirety of the first image is located, or an area of the first image other than a preset area. Alternatively, the first area may be an area where a first touch operation of a user occurs. The second sub-image may be determined in various manners. As an example, the second sub-image may be determined based on a neighboring area of an area where the first sub-image is located by applying an image inpainting algorithm. As another example, the second sub-image may be determined by: acquiring at least one image containing the same scene as that in the first image, the at least one image not containing the first image; determining from the at least one image a third image that does not contain the first object; and determining a sub-image of the third image, which is located in the same area as the first sub-image, as the second sub-image.

After acquiring the first image, the first sub-image corresponding to the first object may be determined from the first image and then replaced with the second sub-image to form the second image. This may automatically remove a part of content from the first image.

Furthermore, because there is no additional image processing software needed to process the first image, the present disclosure may reduce time spent in removing a part of content in the image while reducing processing burdens on the electronic device.

Numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Figure 1:
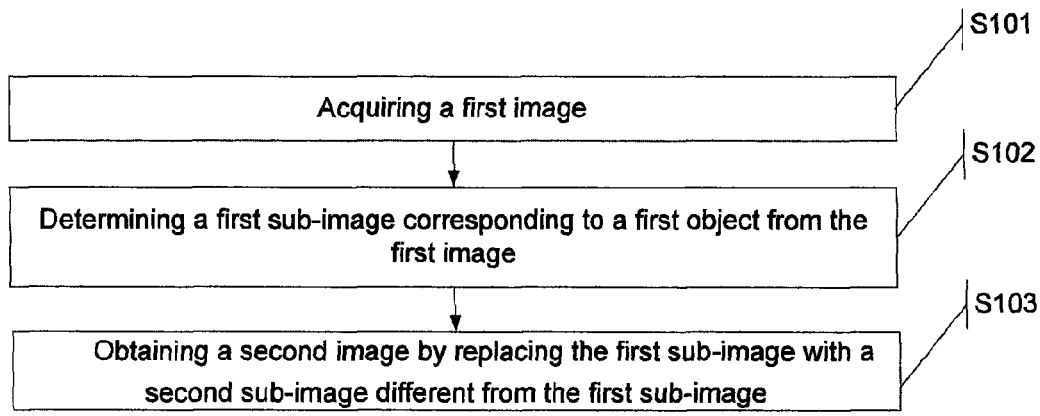
FIG. 1 shows a flowchart of an image acquiring method according to an embodiment of the present disclosure.

In a first aspect, an embodiment of the present disclosure provides an image acquiring method. Referring to FIG. 1, the method may include:

step S101: acquiring a first image;
step S102: determining a first sub-image corresponding to a first object from the first image; and
step S103: replacing the first sub-image with a second sub-image different from the first sub-image to obtain a second image.

At step S101, the first image may be obtained either by an image acquiring device included in the electronic device, or by an external image acquiring device of the electronic device. However, the present disclosure is not limited thereto.

At step S102, determining the first sub-image corresponding to the first object from the first image may include:
analyzing a first area of the first image to determine the first sub-image.

In an implementation, before analyzing the first area at step S102, the first area is determined. This may be implemented in various methods, three of which will be described in the following and the present disclosure is not limited thereto.

A first method is to determine an area where an entirety of the first image is located as the first area.

In particular, when determining the first sub-image by using the first image, the entirety of the first image is analyzed.

A second method is to determine an area of the first image other than a preset area as the first area.

In an implementation, the preset area may be any area, such as a focus area, a central area, etc. This may ensure that image information in the preset area cannot be changed. Usually, the user might wish to acquire an image in the preset area. Thus, this method may ensure useful image information would not be removed. Moreover, because only a part of area in the first image is analyzed, this may reduce processing burdens on the electronic device.

A third method is to detect a first touch operation of the user and determine an area where the first touch operation occurs as the first area.

In an implementation, upon detecting the first touch operation, it may be determined that the user wishes to replace a sub-image in a certain area and thereby the area where the first touch operation occurs is determined as the first area, without analyzing the first image. Then, only the area where the first touch operation occurs is analyzed. As a size of the area is small, it is only needed to analyze a small area by the electronic device, thereby reducing processing burdens on the electronic device. Moreover, as the first sub-image corresponding to the area where the first touch operation occurs is usually not desired by the user, this method may more accurately remove the interfering content.

In an implementation, the first area may be analyzed in various methods to obtain the first sub-image. The analyzing may be implemented in the following three methods, but the present disclosure is not limited to thereto.

Figure 2:
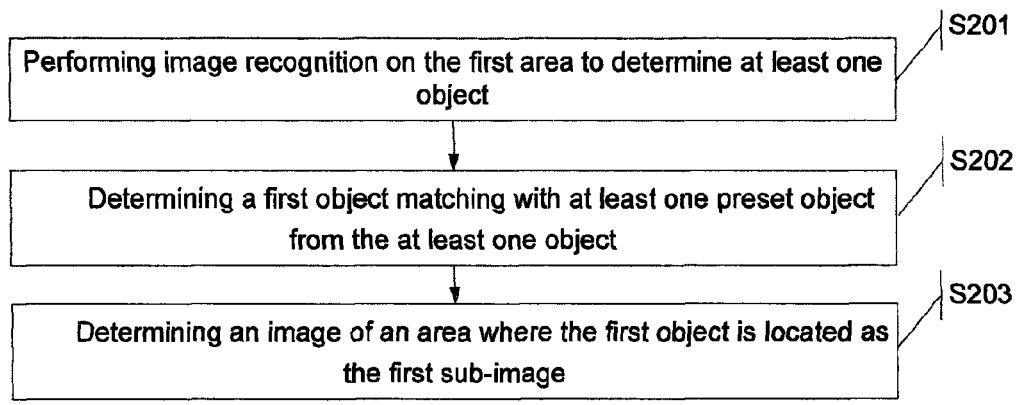
FIG. 2 shows a flowchart of determining a first sub-image in the image acquiring method according to the embodiment of the present disclosure.

A first method is to analyze the first area of the first image to determine the first sub-image. Referring to FIG. 2, this manner may include:

step S201: performing image recognition on the first area to determine at least one object;
step S202: determining a first object matching with at least one preset object from the at least one object; and
step S203: determining an image of an area where the first object is located as the first sub-image.

At step S201, the feature recognition scheme may be used to identify multiple objects, i.e., the at least one object, in the first area. For example, the at least one object may include vehicles, electric wires, flowers, trees, etc.

At step S202, a database may be pre-set for storing the at least one preset object. The at least one preset object may be image(s) or text. For example, the database may store an image or a name of an undesired object, such as a garbage can, a telegraph pole, etc. After determining the at least one object at step S201, the at least one object may be matched with the at least one preset object. For example, the image matching may be performed directly. Alternatively, a name of the at least one object may be determined firstly and then matched with a name of the stored at least one preset object. The present disclosure is not limited to these manners.

In an implementation, the determined first object may be one or more objects, but the present disclosure is not limited thereto.

In the above solutions, multiple preset objects should be stored beforehand. After the at least one object is obtained, it is matched with the preset objects. If the matching is successful, the at least one object is a preset object. In this case, undesired objects would not be identified as the first object. Moreover, this may avoid some objects, which the user wishes to remove, from not being identified, thereby making the determined sub-image more accurate.

At step S203, when the first object is matched with a preset object, the first object is not desired by the user. Then, an image of an area where the first object is located may be determined as the first sub-image.

Figure 3:
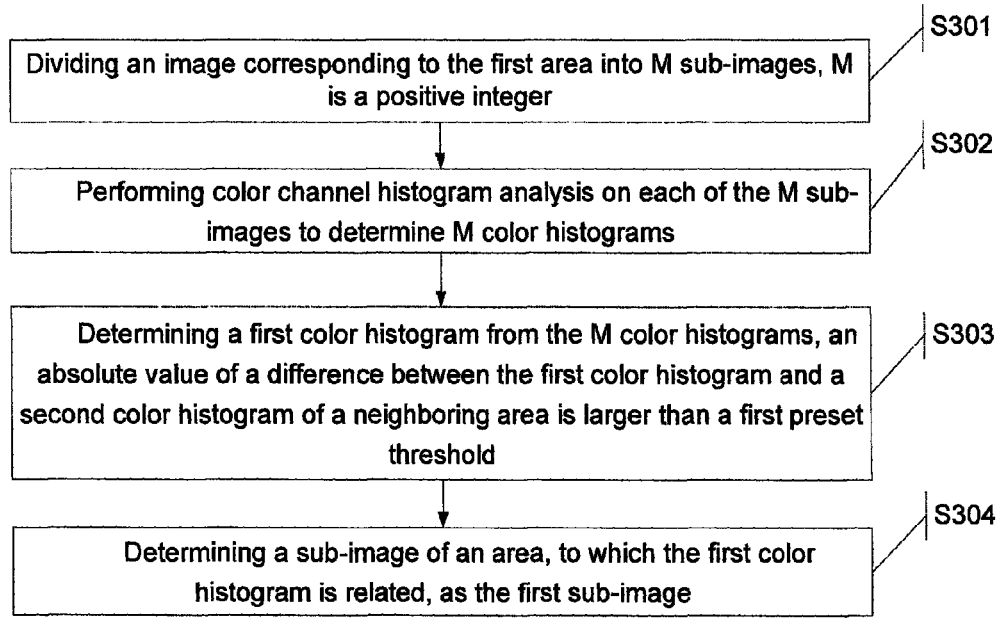
FIG. 3 shows a flowchart of a first method for analyzing a first image in the image acquiring method according to the embodiment of the present disclosure.

A second method is to analyze the first image and then determine the first sub-image. Referring to FIG. 3, this method may include:

step S301: dividing an image corresponding to the first area into M sub-images, M is a positive integer;

step S302: performing color channel histogram analysis on each of the M sub-images to determine M color histograms;

step S303: determining a first color histogram from the M color histograms, an absolute value of a difference between the first color histogram and a second color histogram of a neighboring area being larger than a first preset threshold; and step S304: determining a sub-image of an area, to which the first color histogram is related, as the first sub-image.

According to the above solutions, it is not necessary to pre-store related text or image information for determining the first sub-image, thereby reducing storage burdens on the electronic device.

At step S301, the M sub-images may be any number of sub-images. The larger M is, the higher the analysis accuracy of the first image is.

At step S302, when performing color channel histogram analysis on each of the M sub-images, color features of the M sub-images, i.e., a ratio of color for each sub-image in the M sub-images, may be determined.

At step S303, any two of the M color histograms may be matched with each other. If an absolute value of a difference between ratio of color for two color channel histograms is larger than the first preset threshold, this means that color difference of two sub-images corresponding to the two color channel histograms is large. If the absolute value is smaller than the first preset threshold, the color difference of these two sub-images is small.

If an absolute value of a difference between a color histogram of a sub-image and that of any one of the remaining sub-images is larger than the first preset threshold, it may be determined that this sub-image significantly differs from its neighboring areas. In this case, a color histogram corresponding to this sub-image may be determined as a first color histogram.

In usual, the user may determine focus information when acquiring an image and ensure that an object of the focus information is prominent. Because the sub-image corresponding to the first color histogram is prominent and it is not a focus area, it would lead interference to the focus area. Thus, at step S304, such a sub-image may be determined as the first sub-image is to be replaced.

Figure 4:
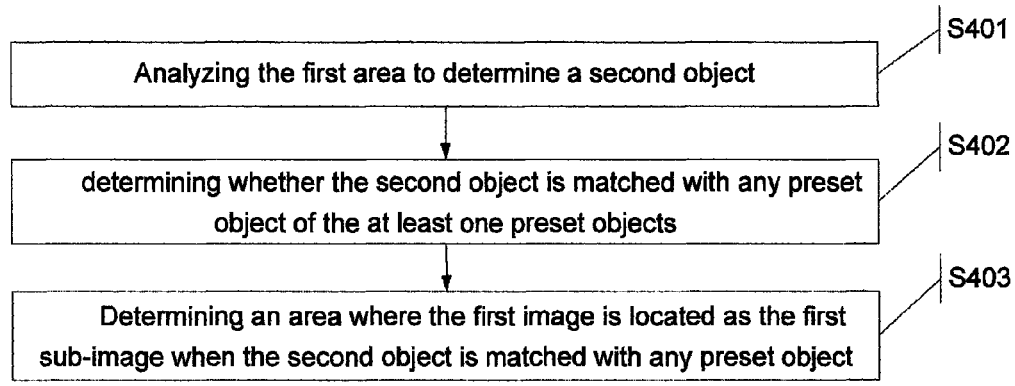
FIG. 4 shows a flowchart of a second method for analyzing a first image in the image acquiring method according to the embodiment of the present disclosure.

A third method is to analyze the first area of the first image to determine the first sub-image. Referring to FIG. 4, this method may include:

step S401: analyzing the first area to determine a second object;

step S402: determining whether the second object is matched with any preset object of the at least one preset object or not; and step S403: determining an area where the first image is located as the first sub-image when the second object is matched with any preset object.

At step S401, the first area may be analyzed by determining the second object from the first area by applying the feature recognition scheme.

At step S402, the second object is matched with the at least one preset object, after determining the second object. In particular, it is to determine whether the second object is an undesired object.

At step S403, when the second object is matched with the at least one preset object, the second object is determined as an interfering object. Then, an area where the second object is located, i.e., an image where the first area is located, may be determined as the first sub-image.

When the second object is not matched with the at least one preset object, this means that the second object is not an interfering object. Thus, the first sub-image cannot be determined.

Given that the above third method for determining the first sub-image corresponds to the third method for determining the first area. In this case, the area analyzed when determining the first sub-image in the third method is very small, i.e., just an area corresponding to the user's touch operation. Thereby, this may reduce processing burdens on the electronic device while saving time.

In an implementation, before the first sub-image is replaced with the second sub-image at step S103, it is firstly to determine the second sub-image. Two methods for determining the second sub-image will be described in the following, but the present disclosure is not limited thereto.

A first method is to determine the second sub-image based on a neighboring area of an area where the first sub-image is located by applying an image inpainting algorithm.

In an implementation, a part of image may be directly selected from the neighboring area as the second sub-image. Alternatively, in order to make the second sub-image fuse with the neighboring area after replacing the first sub-image with the second sub-image, some processing may be performed on the part of image to obtain the second sub-image. For example, the processing may include de-noising, de-blurring, filtering, parameter or non-parameter estimation, etc.

The above solutions may determine the second sub-image by only acquiring a single image, thereby reducing processing burdens on the electronic device.

Figure 5:
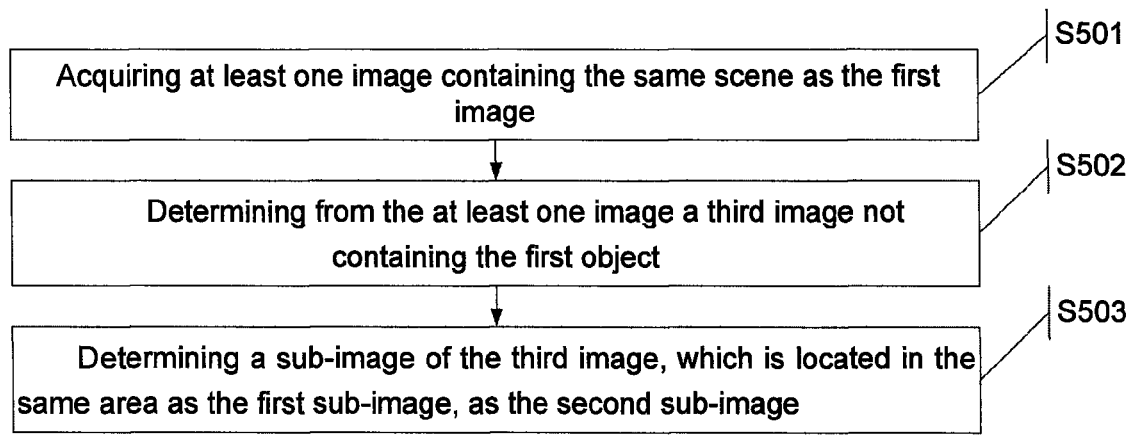
FIG. 5 shows a flowchart of a third method for analyzing a first image in the image acquiring method according to the embodiment of the present disclosure.

A second method is to determine the second sub-image by the following steps as shown in FIG. 5:

step S501: acquiring at least one image containing the same scene as that in the first image, wherein the at least one image is different from the first image;

step S502: determining from the at least one image a third image not containing the first object; and step S503: determining a sub-image of the third image, which is located in the same area as the first sub-image, as the second sub-image.

At step S501, before or after acquiring the first image, multiple images of the same scene may be captured. The multiple images may contain a moving object, such as a person, a bird, a butterfly, etc.

When the user has the focus fixed, he or she usually has not excepted a sudden appearance of a moving object in a photo. In this case, the third image not containing the first object may be selected at step S502.

Then, at step S503, a sub-image located in the same area as the first sub-image may be determined from the first image as the second sub-image.

According to the above solutions, at least one image containing the same scene as that in the first image is captured, and then the second sub-image is determined from the at least one image. Because the at least one image contains the same scene as that in the first image, replacing the first sub-image with the determined second sub-image would lead to better merging, especially facilitating removing moving objects captured on the first image.

In an implementation, the first sub-image may be replaced directly with the second sub-image to obtain the second image. Alternatively, the first sub-image may be replaced with the second sub-image when there is a trigger condition. The trigger condition may be any trigger condition, such as an operation of detecting that the user generates a preset gesture, an operation of detecting the user's preset voice information, etc. The present disclosure is not limited thereto.

Figure 6:
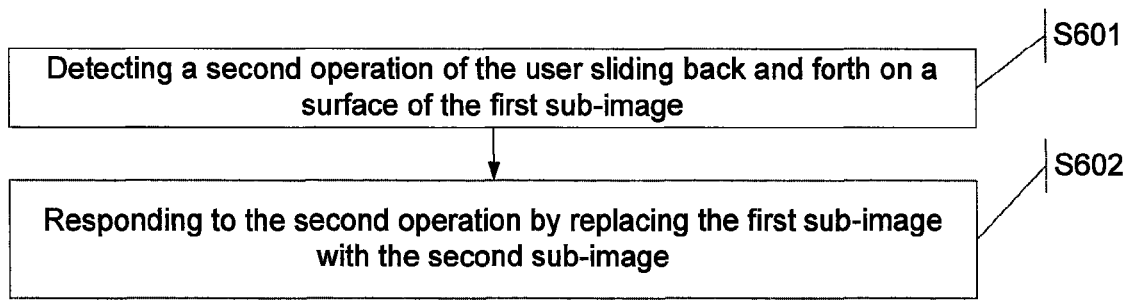
FIG. 6 shows a flowchart of replacing a first sub-image with a second sub-image in the image acquiring method according to the embodiment of the present disclosure.

In a preferable embodiment, replacing the first sub-image with the second sub-image at step S103 may include the following steps as shown in FIG. 6:
  step S601: detecting a second operation of the user sliding back and forth on a surface of the first sub-image; and
  step S602: responding to the second operation by replacing the first sub-image with the second sub-image.

In particular, the trigger condition of replacing the first sub-image with the second sub-image is the second operation. The user is usually not satisfied with the first sub-image when he or she slides back and forth on the surface of the first sub-image. In this case, replacing the first sub-image with the second sub-image may reduce interfering information in the second image, thereby improving user experience.

In a preferable embodiment, after determining from the first image the first sub-image corresponding to the first object at step S102, the method may include:
  displaying a first operation identifier on the first sub-image to prompt the user to replace the first sub-image with the second sub-image by performing a second operation.

In particular, the first operation identifier may be used to generate prompt information for the electronic device's user. In an implementation, the first operation identifier may be any operation identifier, such as an identifier highlighting the first sub-image, an identifier generating a first color on an edge of the first sub-image; an identifier drawing "×," an identifier drawing "−," etc. These are not limiting.

The above solutions display the first operation identifier on the first sub-image. This may protect the user from selecting a non-replaceable area for operating and further reduce error operations caused by the user. Thereby, this may enable the user to select a replaceable area for operating within a shortest time period, thereby reducing time spent in reducing interfering information in the second image while improving user experience.

In an implementation, the second operation may be, for example, an operation of clicking the first operation identifier.

In a preferable embodiment, after replacing the first sub-image with the second sub-image at step S103, the method may further include:
  displaying a second operation identifier on the second sub-image to prompt the user to restore the second sub-image to the first sub-image by a third operation for the second operation identifier.

In an implementation, the second operation identifier may be any operation identifier, such as an operation identifier drawing "√" an operation identifier drawing "+," etc. These are not limiting.

Using the second operation identifier may facilitate the user restoring the second sub-image to the first sub-image after replacing the first sub-image with the second sub-image. This may protect the first sub-image from being replaced with the second sub-image due to an error operation. Also, in this case, the user may repeatedly preview comparison diagrams before and after replacing the first sub-image with the second sub-image, and furthermore the user may select the favourite image. Thereby, this may improve user experience.

For example, the third operation may be an operation of clicking the second operation identifier.

The method of the electronic device for information processing according to the present disclosure will be described in the following several embodiments, which relate to several possible application scenarios for the method for information processing. It should be noted that the embodiments herein are intended to be illustrative, other than limiting. All embodiments conforming to the idea of the present disclosure fall within the scope of the present disclosure.

First Embodiment

In this embodiment, the second sub-image is determined by applying the image inpainting algorithm, and the electronic device is a mobile phone.

Figure 7A:
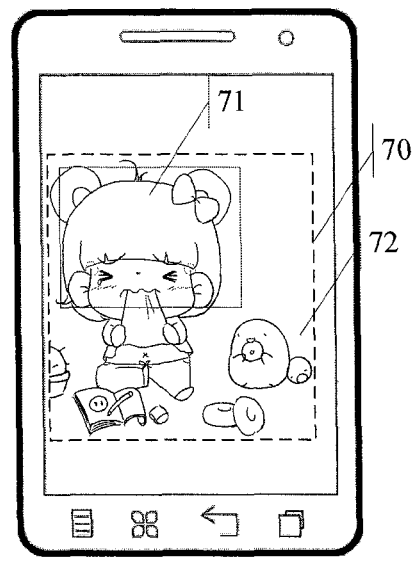
FIG. 7a shows a schematic diagram of acquiring an image 70 according to a first embodiment of the present disclosure.

At moment T1, the user A acquires an image 70 by the mobile phone, as shown in FIG. 7a.

Figure 7B:
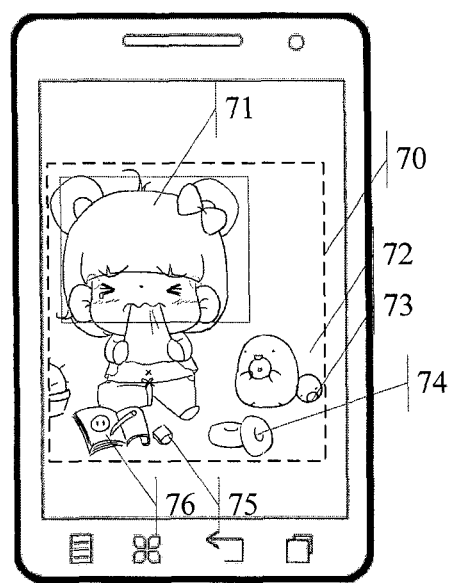
FIG. 7b shows a schematic diagram of determining four objects according to the first embodiment of the present disclosure.

The mobile phone determines an area of the first image different from a focus area 71 as a first area 72. Then, the mobile phone performs feature recognition on the first area 72 to identify four objects, i.e., object 73, object 74, object 75, and object 76, as shown in FIG. 7b.

Figure 7C:
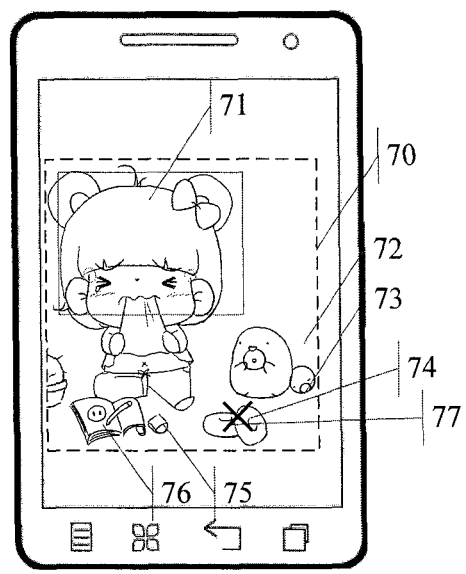
FIG. 7c shows a schematic diagram of setting a first operation identifier for a first object according to the first embodiment of the present disclosure.

Then, the mobile phone matches these four objects with a preset object and determines the object 74 as the first object. Referring to FIG. 7c, the mobile phone displays a first operational identifier 77 on the object 74.

Figure 7D:
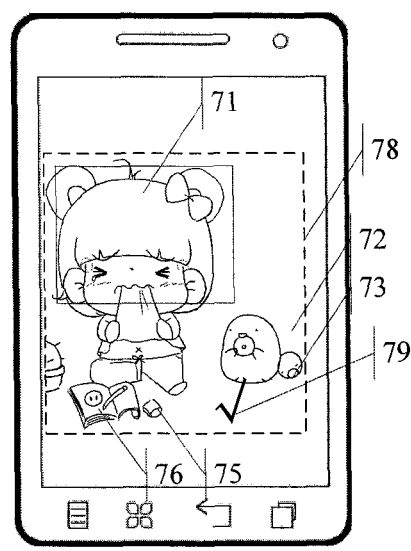
FIG. 7d shows a schematic diagram of replacing a first object with its surrounding blank area by applying an image inpainting algorithm according to the first embodiment of the present disclosure.

After seeing the first operational identifier 77, the user clicks the first operational identifier 77. After detecting the user's operation of clicking the first operational identifier 77, the mobile phone replaces the object 74 with its surrounding blank area by applying the image inpainting algorithm, and then obtains an image 78, as shown in FIG. 7d. Meanwhile, the mobile phone displays a second operational identifier 79 an area of the object 73. If the user clicks the second operational identifier 79 again, the second operational object will be restored, as shown in FIG. 7c.

Second Embodiment

In this embodiment, the image acquiring method of the present disclosure is described when the second image is determined from at least one image containing the same scene as that in the first image. In this embodiment, the electronic device is a tablet computer.

Figure 8A:
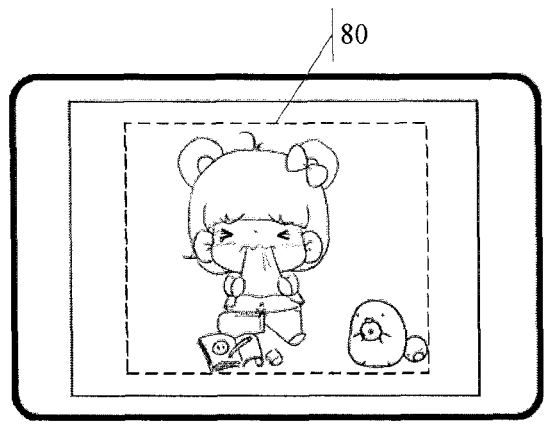
FIG. 8a shows a schematic diagram of acquiring an image 80 according to a second embodiment of the present disclosure.

At moment T2, the user A acquires an image 80 by the tablet computer, as shown in FIG. 8a. After acquiring the image 80, the user A may feel a first area of the first image is too abrupt. Thus, the user A may perform a first touch operation on the first area.

Figure 8B:
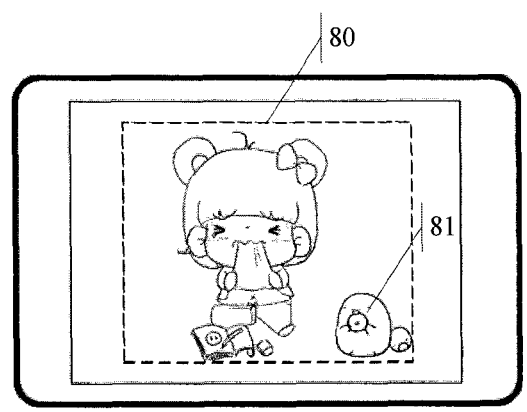
FIG. 8b shows a schematic diagram of determining a first object according to the second embodiment of the present disclosure.

The tablet computer detects the use A's first touch operation on the first area. Thereafter, the table computer analyzes the first area, as shown in FIG. 8b, and then determines an object 81. Meanwhile, the table computer matches the object 81 with a preset object. When the matching is successful, the tablet computer determines the object 81 as the first object.

Figure 8C:
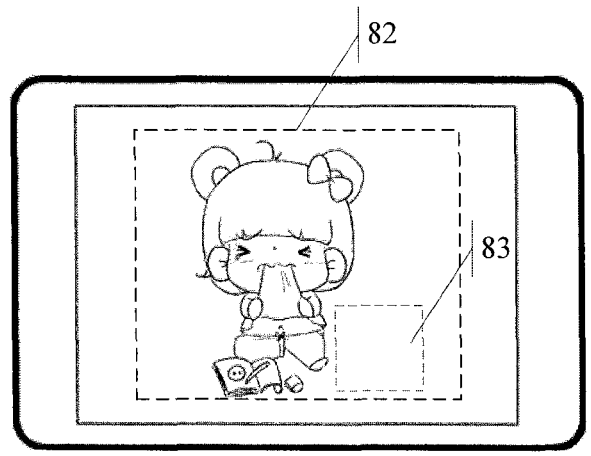
FIG. 8c shows a schematic diagram of acquiring an image 82 not containing the first object according to the second embodiment of the present disclosure.
Figure 8D:
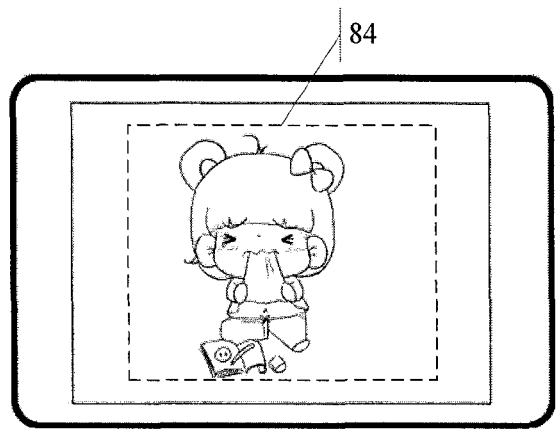
FIG. 8d shows a schematic diagram after replacing the first object with a second sub-image according to the second embodiment of the present disclosure.

Furthermore, as shown in FIG. 8c, the tablet computer acquires an image 82 not containing the object 81, and then determines from the image 82 a sub-image 83, which is located in the same area as the object 81, as the second sub-image. Then, the tablet computer replaces the object 81 with the sub-image 83 to form an image 84, as shown in FIG. 8d.

Figure 9:
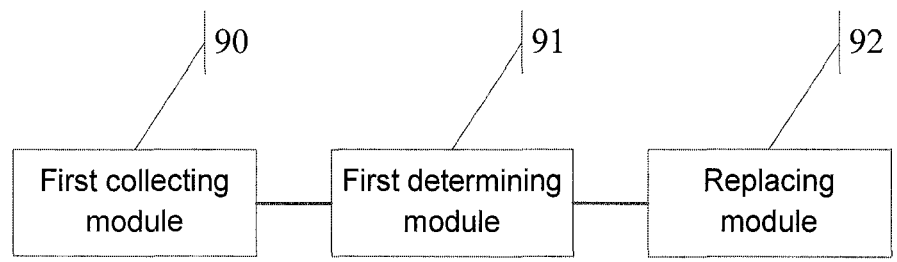
FIG. 9 shows a structure diagram of an electronic device according to an embodiment of the present disclosure.

In a second aspect, the present disclosure provides an electronic device. Referring to FIG. 9, the electronic device may include:

a first acquiring module 90 configured to acquire a first image;

a first determining module 91 configured to determine a first sub-image corresponding to a first object from the first image; and a replacing module 92 configured to replace the first sub-image with a second sub-image different from the first sub-image to obtain a second image.

Optionally, the first determining module 91 is configured to:

analyze a first area of the first image to determine the first sub-image.

Optionally, the electronic device further comprises:

a second determining module configured to, before analyzing the first area of the first image, determine an area where an entirety of the first image is located as the first area; or determine an area of the first image different from a preset area as the first area.

Optionally, the electronic device further comprises:

a detecting module configured to, before analyzing the first area of the first image, detect a first touch operation of a user; and a third determining module configured to determine an area where the first touch operation occurs as the first area.

Optionally, the first determining module comprises:

a first determining unit configured to determine at least one object by performing image recognition on the first area;

a second determining unit configured to determine a first object matched with at least one preset object from the at least one object; and a third determining unit configured to determine an image of an area where the first object is located as the first sub-image.

Optionally, the first determining module 91 comprises:

a dividing unit configured to divide an image corresponding to the first area into M sub-images, M being a positive integer;

a first analysis unit configured to perform color channel histogram analysis on each of the M sub-images to determine M color histograms;

a fourth determining unit configured to determine a first color histogram from the M color histograms, an absolute value of a difference between the first color histogram and a second color histogram of a neighboring area being larger than a first preset threshold; and a fifth determining unit configured to determine a sub-image of an area where the first color histogram is located as the first sub-image.

Optionally, the first determining module 91 comprises:

a second analysis unit configured to analyze the first area to determine a second object;

a determining unit configured to determine whether the second object is matched with any preset object of at least one preset object; and a sixth determining unit configured to determine an image where the first area is located as the first sub-image when the second object is matched with any preset object.

Optionally, the electronic device further comprises:

a fourth determining module configured to, before replacing the first sub-image with the second sub-image different from the first sub-image, determine the second sub-image based on a neighboring area of an area where the first sub-image is located by applying an image inpainting algorithm.

Optionally, the electronic device further comprises:

a second acquiring module configured to, before replacing the first sub-image with the second sub-image different from the first sub-image, acquire at least one image containing the same scene as that in the first image, wherein the at least one image is different from the first image;

a fifth determining module configured to determine from the at least one image a third image that does not contain the first object; and a sixth determining module configured to determine a sub-image of the third image, which is located in the same area as the first sub-image, as the second sub-image.

Optionally, the replacing module 92 comprises:

a detecting unit configured to detect a second operation of a user sliding back and forth on a surface of the first sub-image; and a responding unit configured to respond to the second operation by replacing the first sub-image with the second sub-image.

Optionally, the electronic device further comprises:

a first displaying module configured to, after determining the first sub-image corresponding to the first object from the first image, display a first operation identifier on the first sub-image to prompt a user to replace the first sub-image with the second sub-image by performing a second operation.

Optionally, the electronic device further comprises:

a second displaying module configured to, after replacing the first sub-image with the second sub-image different from the first sub-image, a second operation identifier on the second sub-image to prompt the user to restore the second sub-image to the first sub-image by a third operation for the second operation identifier.

Optionally, the second operation includes an operation of clicking the first operation identifier, or the third operation includes an operation of clicking the second operation identifier.

According to the above descriptions, the above electronic device may implement the above image acquiring method. The operating procedures of the electronic device are identical with one or more embodiments of the method. Thus, details thereof will be omitted here.

One or more technical solutions according to embodiments of the present disclosure have at least technical effects or advantages as follows.

(1) The embodiments of the present disclosure may determine a first sub-image corresponding to a first object after acquiring a first image, and then replace the first sub-image with a second sub-image to form a second image. This may automatically remove a part of content in the first image when acquiring the image.

Furthermore, because there is no additional image processing software needed to process the first image, the present disclosure may reduce time spent in removing a part of content in the image while reducing processing burdens on the electronic device.

(2) The embodiments of the present disclosure may determine the first sub-image by analyzing a first area of the first image to obtain the first sub-image. The determining of the first area may be implemented in various manners, such as determining an area where an entirety of the first image is located as the first area; determining an area of the first image other than a preset area as the first area; detecting a first touch operation of the user and determining an area where the first touch operation occurs as the first area. Thereby, this may make determining of the first area more varied.

Furthermore, in determining an area of the first image other than the preset area as the first area, because the preset area is usually an image that is desired by the user, the present disclosure may avoid removing useful image information. Moreover, only analyzing a part of the first image may reduce processing burdens on the electronic device.

Furthermore, in determining an area where the first touch operation occurs as the first area, because only the first area is analyzed and the first area corresponding to the first touch operation is small, it is only needed to analyze a small area by using the electronic device. This may reduce processing burdens on the electronic device. Moreover, the first sub-image corresponding to the area where the first touch operation occurs is usually interfering content, this may make removing of the interfering content more accurate.

(3) The embodiments of the present disclosure may pre-store multiple preset objects, and after obtaining at least one object, match the at least one object with the preset objects. If the matching is successful, this means that the at least one object is a preset object. This may avoid identifying a desired object as the first object while avoiding some objects, which the user wishes to remove, from not being identified. Thereby, the determined first sub-image would be more accurate.

(4) The embodiments of the present disclosure may determine the first sub-image by using M color histograms of M sub-images corresponding to the first area. That is, there is no need to pre-store related text or image information for determining the first sub-image. Thus, this may reduce storage burdens on the electronic device.

(5) The embodiments of the present disclosure may directly determine an image where the first area is located as the first image when the first area is an area where the first touch operation of the user occurs or when there is a second object matched with the preset objects in the first area. That is, when analyzing the first area, it is only needed to analyze a small area. Thereby, this may reduce processing burdens on the electronic device.

(6) The embodiments of the present disclosure may determine the second sub-image by applying the image inpainting algorithm. That is, the image acquiring device may only need to acquire a single image, thereby reducing processing of the electronic device.

(7) The embodiments of the present disclosure may acquire at least one image containing the same scene as that in the first image and then determine the second sub-image by using the at least one image. Because the at least one image contains the same scene as that in the first image, replacing the first sub-image with the determined second sub-image has better fusing, especially facilitating removing moving objects captured on the first image.

(8) The embodiments of the present disclosure may replace the first sub-image with the second sub-image when detecting a second operation that the user slides back and forth on a surface of the first sub-image. The user is usually not satisfied with the first sub-image when he or she slides back and forth on the surface of the first sub-image. In this case, replacing the first sub-image with the second sub-image may reduce interfering information in the second image, thereby improving user experience.

(9) The embodiments of the present disclosure may display the first operation identifier on the first sub-image. This may protect the user from selecting a non-replaceable area for operating and further reduce the number of error operations from the user. Thereby, this may enable the user to select a replaceable area for operating within a shortest time period, thereby reducing time spent in reducing interfering information in the second image while improving user experience.

(10) The embodiments of the present disclosure may display the second operation identifier on a surface of the second sub-image after replacing the first sub-image with the second sub-image. The third operation for the second operation identifier may facilitate the user restoring the second sub-image to the first sub-image after replacing the first sub-image with the second sub-image. This may protect the first sub-image from being replaced with the second sub-image due to the error operation. Also, in this case, the user may repeatedly preview comparison diagrams before and after replacing the first sub-image with the second sub-image, and then the user can select the favourite image. Thereby, this may improve user experience.

It will be appreciated that the embodiments of the present disclosure may be embodied as methods, systems or computer program products. Therefore, the present disclosure may be implemented in a form of pure hardware embodiments, pure software embodiments or embodiments incorporating software and hardware. Moreover, the present disclosure may be implemented in a form of a computer program product embodied on one or more computer readable storage medium (including, but not limited to, a magnetic disk storage, a CD-ROM, a optical storage, etc) containing computer readable program codes.

The present disclosure is described with reference to flowcharts and/or block diagrams of methods, devices (systems), and computer program products according to the embodiments of the present disclosure. It will be appreciated that each flow and/or block in the flowcharts and/or block diagrams and combinations thereof may be implemented by computer program instructions. The computer program instructions may be provided to a general purpose computer, a dedicated computer, an embedded processor or processors of other programmable data processing devices to form a machine, so that apparatus for implementing functions designated by one or more flows in a flowchart and/or one or more blocks in a block diagram may be generated by means of instructions executed by the computer or processors of other programmable data processing devices.

The computer program instructions may be also stored in a computer readable storage, which can direct the computer or other programmable data processing devices to operate in a specific manner. To this end, instructions stored in the computer readable storage may produce article of manufacture including instructions means. The instructions means implement functions as specified in one or more flows in a flowchart and/or one or more blocks in a block diagram.

The computer program instructions may be also loaded into a computer or other programmable data processing devices, so as to execute a serial of operation steps on the computer or other programmable data processing devices to produce actions taken by the computer. To this end, instructions executed on the computer or other programmable devices may be provided to implement functions as specified in one or more flows in a flowchart and/or one or more blocks in a block diagram.

It will be appreciated by the person of skill in the art that various modifications may be made to the above described embodiments without departing from the scope of the present disclosure. Therefore, the scope of the present disclosure should be recited in the claims.

What is claimed is:

1. An image acquiring method comprising:
acquiring a first image;
determining a first sub-image corresponding to a first object from the first image; and
replacing the first sub-image with a second sub-image different from the first sub-image to obtain a second image,
wherein the determining the first sub-image corresponding to the first object from the first image comprises:
analyzing a first area of the first image; and
determining a sub-image complying with a predetermined condition as the first sub-image,
wherein the analyzing the first area of the first image and the determining the sub-image comprise:
dividing an image corresponding to the first area into M sub-images, M being a positive integer;
performing a color channel histogram analysis on each of the M sub-images to determine M color histograms;
determining a first color histogram from the M color histograms, an absolute value of a difference between the first color histogram and a second color histogram of a neighbouring area being larger than a first preset threshold; and
determining a sub-image of an area, to which the first color histogram is related, as the first sub-image.

2. The method according to claim 1, wherein, before analyzing the first area of the first image, the method further comprises:
determining an area where an entirety of the first image is located as the first area; or
determining an area of the first image other than a preset area as the first area.

3. The method according to claim 1, wherein, before analyzing the first area of the first image, the method further comprises:
determining at least one object by performing image recognition on the first area;
determining a first object matched with at least one preset object from the at least one object; and
determining an image of an area where the first object is located as the first sub-image.

4. The method according to claim 1, wherein, the analyzing the first area of the first image and the determining the sub-image complying with the predetermined condition comprises:
analyzing the first area to determine a second object;
determining whether the second object is matched with any preset object of at least one preset object; and
determining an image where the first area is located as the first sub-image when the second object is matched with any preset object.

5. The method according to claim 1, wherein, before replacing the first sub-image with the second sub-image different from the first sub-image, the method further comprises:
determining the second sub-image based on a neighboring area of an area where the first sub-image is located by applying an image inpainting algorithm.

6. The method according to claim 1, wherein, before replacing the first sub-image with the second sub-image different from the first sub-image, the method further comprises:
acquiring at least one image containing the same scene as that in the first image;
determining from the at least one image a third image that does not contain the first object; and
determining a sub-image of the third image, which is located in the same area as the first sub-image, as the second sub-image.

7. The method according to claim 1, wherein, replacing the first sub-image with the second sub-image different from the first sub-image comprises:
detecting a second operation of a user sliding back and forth on a surface of the first sub-image; and
responding to the second operation by replacing the first sub-image with the second sub-image.

8. The method according to claim 1, wherein, after determining the first sub-image corresponding to the first object from the first image, the method further comprises:
displaying a first operation identifier on the first sub-image to prompt a user to replace the first sub-image with the second sub-image by performing a second operation.

9. The method according to claim 8, wherein, after replacing the first sub-image with the second sub-image different from the first sub-image, the method further comprises:
displaying a second operation identifier on the second sub-image to prompt the user to restore the second sub-image to the first sub-image by a third operation for the second operation identifier.

10. The method according to claim 8, wherein, the second operation includes an operation of clicking the first operation identifier, or the third operation includes an operation of clicking the second operation identifier.

11. An electronic device comprising:
a first acquiring module configured to acquire a first image;
a first determining module configured to determine a first sub-image corresponding to a first object from the first image; and
a replacing module configured to replace the first sub-image with a second sub-image different from the first sub-image to obtain a second image,
wherein the first determining module is configured to analyze a first area of the first image and to determine a sub-image complying with a predetermined condition as the first sub-image, wherein the first determining module is further configured to:
divide an image corresponding to the first area into M sub-images, M being a positive integer;
perform color channel histogram analysis on each of the M sub-images to determine M color histograms;
determine a first color histogram from the M color histograms, an absolute value of a difference between the first color histogram and a second color histogram of a neighbouring area being larger than a first preset threshold; and
determine a sub-image of an area, to which the first color histogram is related, as the first sub-image.

12. The electronic device according to claim 11, further comprising:
a fourth determining module configured to, before replacing the first sub-image with the second sub-image different from the first sub-image, determine the second sub-image based on a neighboring area of an area where the first sub-image is located by applying an image inpainting algorithm.

13. The electronic device according to claim 11, further comprising:
a second acquiring module configured to, before replacing the first sub-image with the second sub-image different from the first sub-image, acquire at least one image containing the same scene as that in the first image;
a fifth determining module configured to determine from the at least one image a third image that does not contain the first object; and
a sixth determining module configured to determine a sub-image of the third image, which is located in the same area as the first sub-image, as the second sub-image.

14. The electronic device according to claim 11, wherein, the replacing module comprises:
a detecting unit configured to detect a second operation of a user sliding back and forth on a surface of the first sub-image; and
a responding unit configured to respond to the second operation by replacing the first sub-image with the second sub-image.

15. The electronic device according to claim 11, further comprising:
a first displaying module configured to, after determining the first sub-image corresponding to the first object from the first image, display a first operation identifier on the first sub-image to prompt a user to replace the first sub-image with the second sub-image by performing a second operation.

* * * * *